July 29, 1930.  F. MOHR  1,771,858
HARDNESS TESTING APPARATUS
Filed Aug. 6, 1926   2 Sheets-Sheet 2

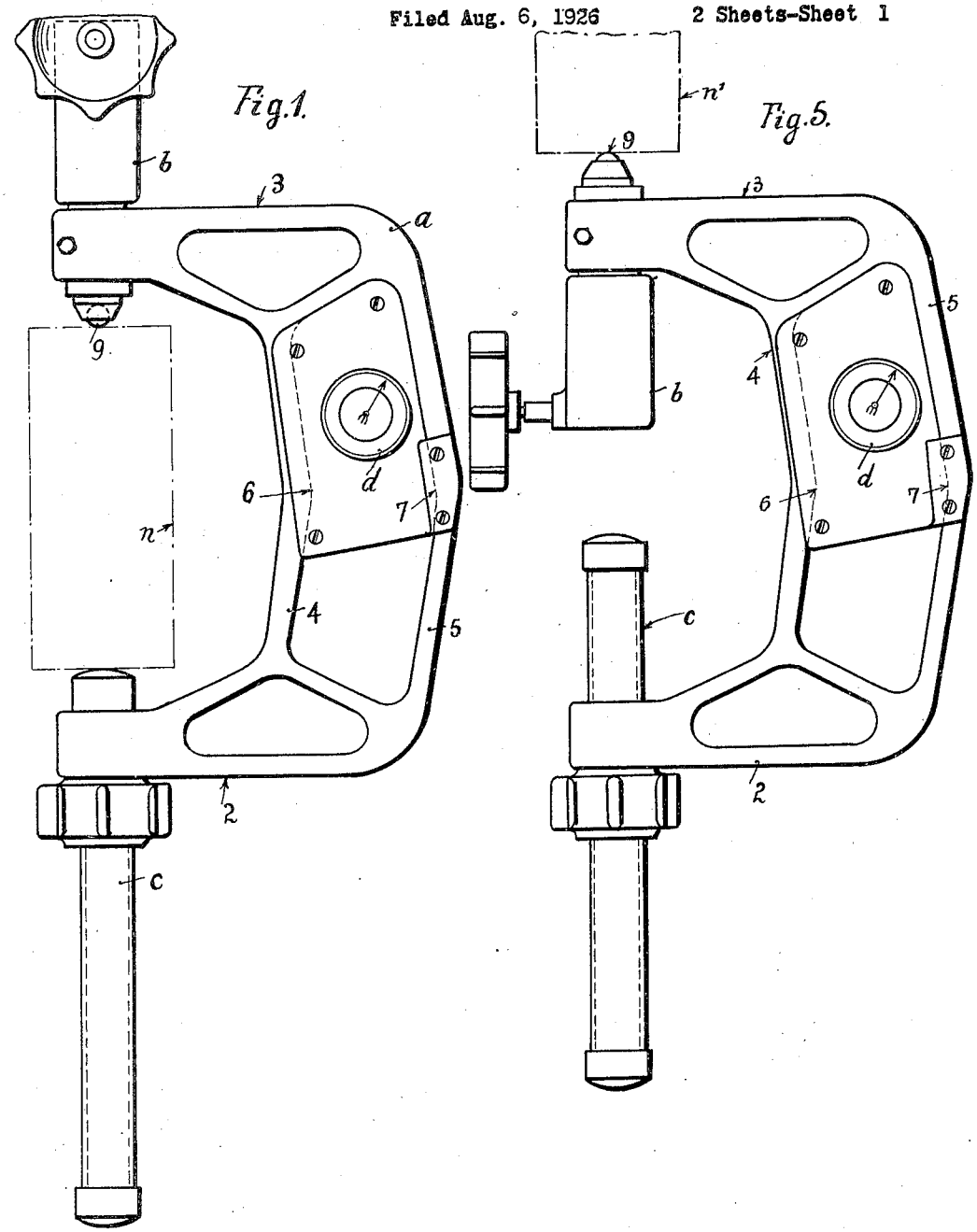

Witnesses:

Inventor:
Dr.-Ing Felix Mohr
by attorney

Patented July 29, 1930

1,771,858

UNITED STATES PATENT OFFICE

FELIX MOHR, OF MANNHEIM, GERMANY

HARDNESS-TESTING APPARATUS

Application filed August 6, 1926, Serial No. 127,657, and in Germany November 12, 1925.

My invention relates to new and useful improvements in hardness testing machines, more especially in machines of the Brinell press type.

As it is well known in such machines, a ball of hardened steel or the like is forced into the test piece thus producing an indentation forming in connection with the corresponding testing pressure a fair scale for the hardness of material. It is, too, well known of such machines that they are of a large bulk and high weight.

It is a primary object of my invention to dispense with these heavy and stationary testing machines and to substitute therefore, simple and easy apparatus available for transporting by hand at any place and constructions as desired.

It is a second object of my invention to ascertain high accuracy of the tests and great movements or angles of oscillation of the pointer of an indicator.

A further object of my invention consists in providing for different directions at which the pressure is transmitted on the ball or the like, in impressing the latter into the testing piece.

With these objects in view my invention consists in the arrangements and combinations of different parts as hereinafter is clearly described and fully shown by drawings, in which Fig. 1 is a side elevation of my new testing clamps.

Fig. 5 shows the apparatus according to Fig. 1 at another position of the parts.

Similar parts are designated by similar references.

Figure 4:
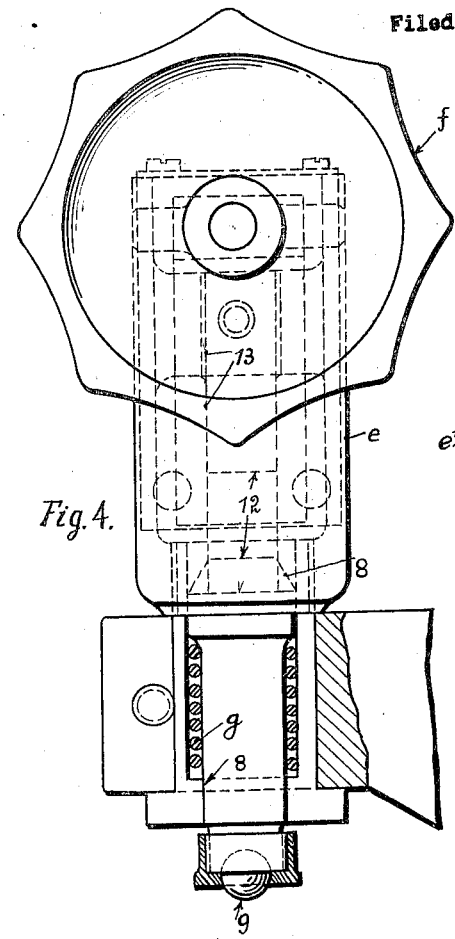
Figs. 2–4 are details in a larger scale.
Figure 3:
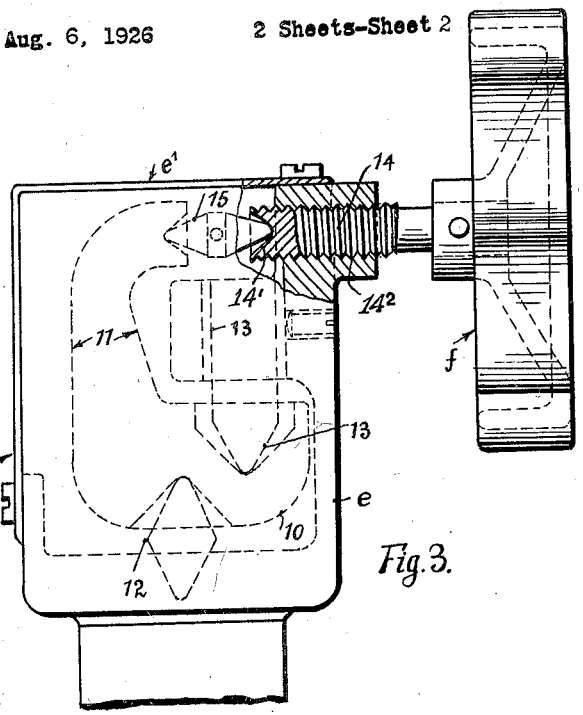
Figure 2:
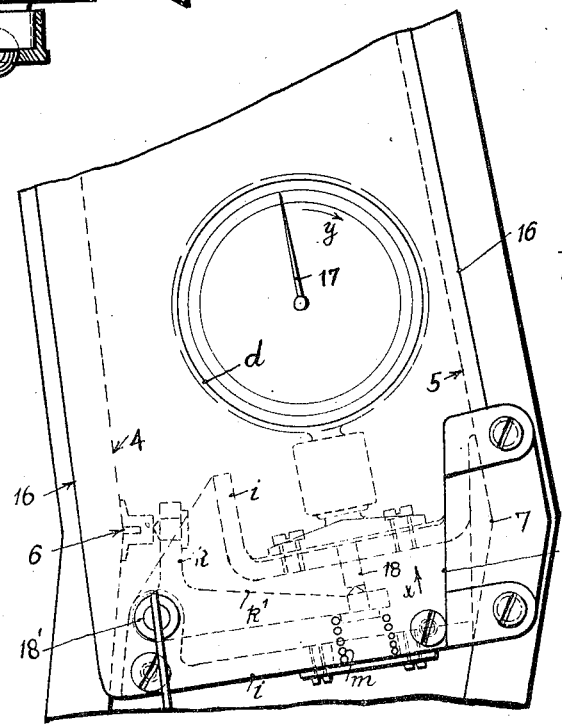

The main parts of the apparatus are a steel frame or bow $a$, a pressure producer $b$, for forcing the ball into the test piece, a counter bearing or helical spindle $c$ and an indicator or measuring tool $d$. The steel frame shows the two parallel legs 2, 3 and a connecting or intermediate part formed by the two breaking or bending bars 4, 5, having the opposite vertices or breaking points 6, 7.

The pressure producer comprises within a casing $e$, closed by cover $e^1$, a die 8, resiliently guided within the leg 2 and carrying the ball 9, a knee-lever 10, 11 carried by the fulcrum bearings 12, 13 and the threaded pressing spindle 14 adapted to be advanced by the hand wheel $f$. The power is transmitted in accordance with the proportion of the lever arms by means of an intermediate piece 15 having conical end parts, engaging the hollow conical end of the shaft 14 and of the lever-arm 11 of a knee-lever 10, 11, the knee-lever 10, 11 and the fulcrum bearing 12 to the die 8 and the ball 9, which is to be forced into any testing piece not further shown; it finds a support by the spindle $c$, screwed into the leg 2 of the clamps $a$. A spring $g$ withdraws the ball after an impression has been made.

Between the two breaking bars 4 and encased by two lateral shields 16 the indicator $d$ with the pointer 17 is arranged. The indicator is mounted on a carrier $i$ and a spring actuated small die 18 operates the pointer 17. The carrier $i$ is with its one end rigidly fastened to the bar 5 at the immediate proximity of the breaking point 7 whereas at its other free end an angle-lever $k$ $k^1$ turns about its pin 18′. The lever arm $k$ is operated by the breaking point 6 and the lever-arm $k^1$ engages with the die 18. A spring $m$ continuously tends to move the die 18 in the direction of the arrow $x$, thus turning the spring-weighted pointer 17 in one direction, say, in the direction of the arrow $y$, whereas the pointer moves in the opposite direction, when the spring $m$ is compressed.

The operation of my testing clamps will now be readily understood: it is supposed a testing piece $n$ is arranged between the ball 9 and the spindle $c$; if now by turning the hand wheel $f$ the ball is forced into the piece $n$, a tensile stress and a compressive stress are materially produced within the bars 4 and 5 respectively, thereby causing the breaking points 4 and 5 to increase their initial distance thus enabling the lever arm $k^1$ being advanced in the direction of the arrow $x$ and the pointer in that of the arrow $y$. Due to the fact of having the bars 4 and 5 broken or bent, by comparatively low forces a great change of the distance of the points 4 and 5 is secured and a sure indication is obtained. Furthermore, as the two bars are essentially subjected to tensile and compressive forces respectively their entire cross section can be utilized for the transmission of the power and thus the weight of the whole apparatus can be made very low.

By arranging the power producer $b$ to assume an inverse position, as indicated by Fig. 5 and supporting the spindle $c$ by any suitable counter bearing $p$, whereas the test piece is at $n^1$, now the bar 4 receives compressive stresses and the bar 5 tensile ones; thus the points 4 and 5 advance toward each other and the pointer 17 rotates oppositely to the arrow $y$.

I wish to be understood that my invention by no means is confined to the form of execution as shown by the drawings; for instance the power producer and the indicator together with its transmitting mechanism may be varied in the most different manner. What I believe to be a material matter of my invention is the clamping-shaped body having either two bent or broken bars or only one bar broken and the other one straight. Furthermore instead of a ball other equivalent means may be used.

I claim:

1. A hardness testing apparatus of the Brinell press type, comprising a clamping-shaped body consisting of two legs and an intermediate or web-part formed by two bent bars with two oppositely arranged vertices, a power producer arranged at the one leg of the clamping-body, a counter bearing carried by the other leg of the clamping-body, transmitting means arranged between the said vertices of the bent bars and an indicator receiving its actuation by the said transmitting means, when the clamping-body is stressed.

2. A hardness testing apparatus comprising a clamping-shaped body consisting of two legs and an intermediate or web-part formed by two bent bars with two oppositely arranged vertices, a power producer arranged at the one leg of the clamping-body, a counter bearing carried by the other leg of the clamping-body, transmitting means arranged between the said vertices of the bent bars and an indicator receiving its actuation by the said transmitting means, when the clamping-body is stressed.

3. A hardness testing apparatus comprising a clamping-body, the web-part of which is formed by two bars at least one of which is bent, a power producer arranged at one free end of the clamping-body, a counter bearing carried by the other end of the clamping-body, transmitting means arranged opposite the vertex of the said bent bar and an indicator receiving its actuation by the said transmitting means, when the clamping-body is put under power.

4. A hardness testing apparatus comprising a clamping-body, showing two legs and an intermediate web-part formed by two bent bars with two oppositely arranged vertices, a power producer, detachably arranged at the one leg of the clamping-body, a helical spindle carried by the other leg of the clamping-body, transmitting means arranged between the said vertices of the bent bars and an indicator receiving its actuation by the said transmitting means, when the clamping-body is put under power.

5. A hardness testing apparatus comprising a clamping-body, showing two legs and an intermediate web-part formed by two bent bars with two oppositely arranged vertices, a power producer having a pressing die detachably carried by the one leg of the clamping-body, a helical spindle carried by the other leg of the clamping-body, transmitting means arranged between the said vertices of the bent bars and an indicator receiving its actuation by the said transmitting means, when the clamping-body is put under power.

6. In a hardness testing apparatus in combination with a clamping-body, a counter bearing, an indicator and transmitting means connected to the clamping body, a pressure producer, consisting of a die resiliently guided within the clamping-body, of a knee-lever, fulcrum bearings carrying the said knee-lever and a pressing spindle for operating the knee-lever and the pressing die respectively.

7. In a hardness testing apparatus in combination with a clamping-body, a pressure producer, a counter bearing and an indicator, comprising a spring actuated die, a carrier rigidly fastened with its one end to the clamping-body, an angle-lever turnably mounted on said carrier, one lever arm being operated by the clamping-body and the other one actuating the said die.

In testimony whereof, I have signed my name to this specification at Frankfort-on-the-Main, Germany, this 21st day of July, 1926.

FELIX MOHR.